United States Patent [19]

Dooley

[11] Patent Number: 5,465,929
[45] Date of Patent: Nov. 14, 1995

[54] LADDER-TYPE CABLE TRAY SYSTEM

[75] Inventor: David M. Dooley, Lafayette, La.

[73] Assignees: B-Line Systems, Inc., Highland, Ill.; Tray-Safe Inc., Lafayette, La.

[21] Appl. No.: 110,306

[22] Filed: Aug. 19, 1993

[51] Int. Cl.⁶ ..................................... F16L 3/22
[52] U.S. Cl. ................... 248/681; 403/268; 403/294
[58] Field of Search ................ 248/49, 68.1, 58; 403/294, 292, 268, 267, 266, 265

[56] References Cited

U.S. PATENT DOCUMENTS

| | | | |
|---|---|---|---|
| 2,040,126 | 5/1936 | Grieve | 403/268 X |
| 2,053,382 | 9/1936 | Stickley | 403/268 |
| 2,656,998 | 10/1953 | Ullberg, Jr. | 248/68 |
| 2,656,999 | 10/1953 | Ullberg, Jr. | 248/68 |
| 2,657,326 | 10/1953 | McCarty | 403/268 |
| 2,662,709 | 12/1953 | Ullberg, Jr. | 248/68 |
| 2,834,622 | 12/1954 | Reeves | 287/62 |
| 3,022,972 | 2/1962 | Bunston | 248/68 |
| 3,042,351 | 7/1962 | Du Bois | 248/49 |
| 3,053,358 | 9/1962 | Gross | 189/36 |
| 3,137,468 | 6/1964 | Meinders | 248/49 |
| 3,521,843 | 7/1970 | Ogle | 248/58 |
| 3,598,349 | 8/1971 | Drake | 248/49 |
| 3,680,817 | 9/1972 | Gogan | 248/68 |
| 3,703,790 | 11/1972 | Mattes et al. | 52/98 |
| 3,791,613 | 2/1974 | Nollen | 248/49 |
| 3,915,420 | 10/1975 | Norris | 248/58 |
| 3,938,767 | 2/1976 | Norris | 248/58 |
| 3,948,473 | 4/1976 | Mason | 248/49 |
| 4,046,343 | 9/1977 | Kambara | 248/49 |
| 4,232,845 | 11/1980 | Turner | 248/49 |
| 4,299,362 | 11/1981 | Buluschek et al. | 248/49 |
| 4,319,724 | 3/1982 | Bradbury | 248/49 |
| 4,370,372 | 1/1983 | Higgins et al. | 428/116 |
| 4,432,519 | 2/1984 | Wright | 248/49 |
| 4,691,818 | 9/1987 | Weber | 403/292 X |
| 4,693,652 | 9/1987 | Sweeney | 411/23 |
| 4,712,957 | 12/1987 | Edwards et al. | 411/82 |
| 4,729,705 | 3/1988 | Higgins | 411/82 |
| 4,765,576 | 8/1988 | Peled | 248/49 |
| 4,776,738 | 10/1988 | Winston | 411/82 |
| 4,802,643 | 2/1989 | Uys | 248/49 |
| 4,820,095 | 4/1989 | Mraz | 411/82 |
| 4,822,202 | 4/1989 | Gustafsson | 403/268 |
| 4,860,513 | 8/1989 | Whitman | 52/410 |
| 4,993,900 | 2/1991 | Hügel et al. | 411/82 |
| 5,004,192 | 4/1991 | Handler | 248/49 |
| 5,007,780 | 4/1991 | Hoffmann et al. | 411/82 |
| 5,100,086 | 3/1992 | Rinderer | 248/49 |
| 5,143,498 | 9/1992 | Whitman | 411/82 |
| 5,209,541 | 5/1993 | Tonotik | 403/292 X |

FOREIGN PATENT DOCUMENTS 2637349  4/1990  France ..................... 248/49

Primary Examiner—Ramon O. Ramirez
Assistant Examiner—Korie H. Chan
Attorney, Agent, or Firm—Senniger, Powers, Leavitt & Roedel

[57] ABSTRACT

A ladder-type cable tray system comprising a first cable tray section and a second cable tray section. Each cable tray section includes first and second rails extending lengthwise of the section at opposite sides of the section and a plurality of rungs extending between the rails at intervals spaced lengthwise of the section. Each of the first and second rails has a tubular portion forming a hollow beam extending the length of the rail. The tubular portion has open ends at opposite ends of the rail and a rung-supporting portion integrally formed as one piece with the tubular portion and depending therefrom. The system further comprises fasteners for securing the rungs to the rung-supporting portions of the first and second rails in a position wherein the rungs span the rung-supporting portions, and a plurality of splices for connecting the first and second cable tray sections end to end. The splices include a first splice sized and shaped for a snug telescoping fit within adjacent open ends of the tubular portions of the first rails of the two cable tray sections, and a second splice sized and shaped for a snug telescoping fit within adjacent open ends of the tubular portions of the second rails of the two cable tray sections.

18 Claims, 6 Drawing Sheets

FIG. 10
FIG. 11
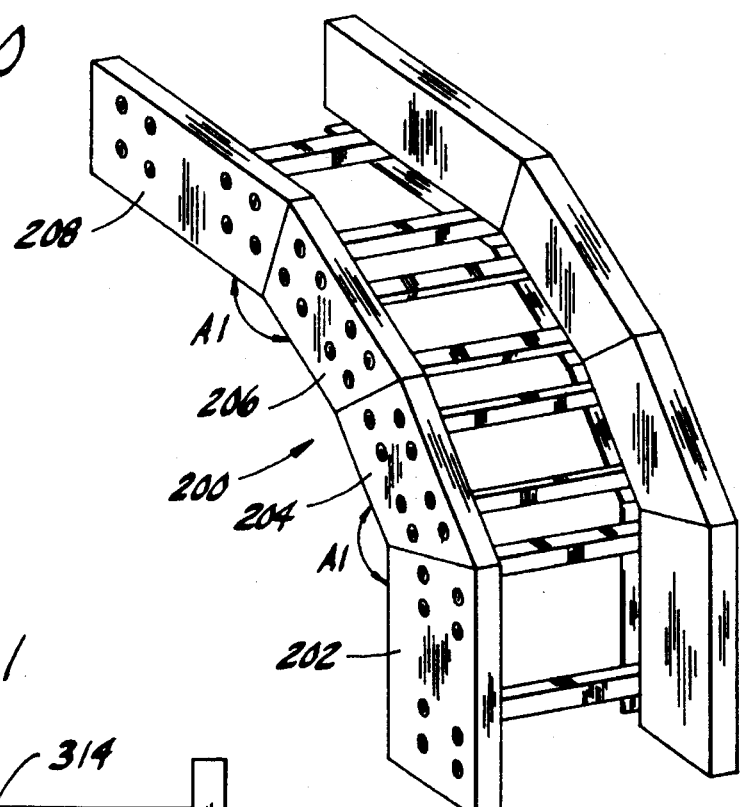
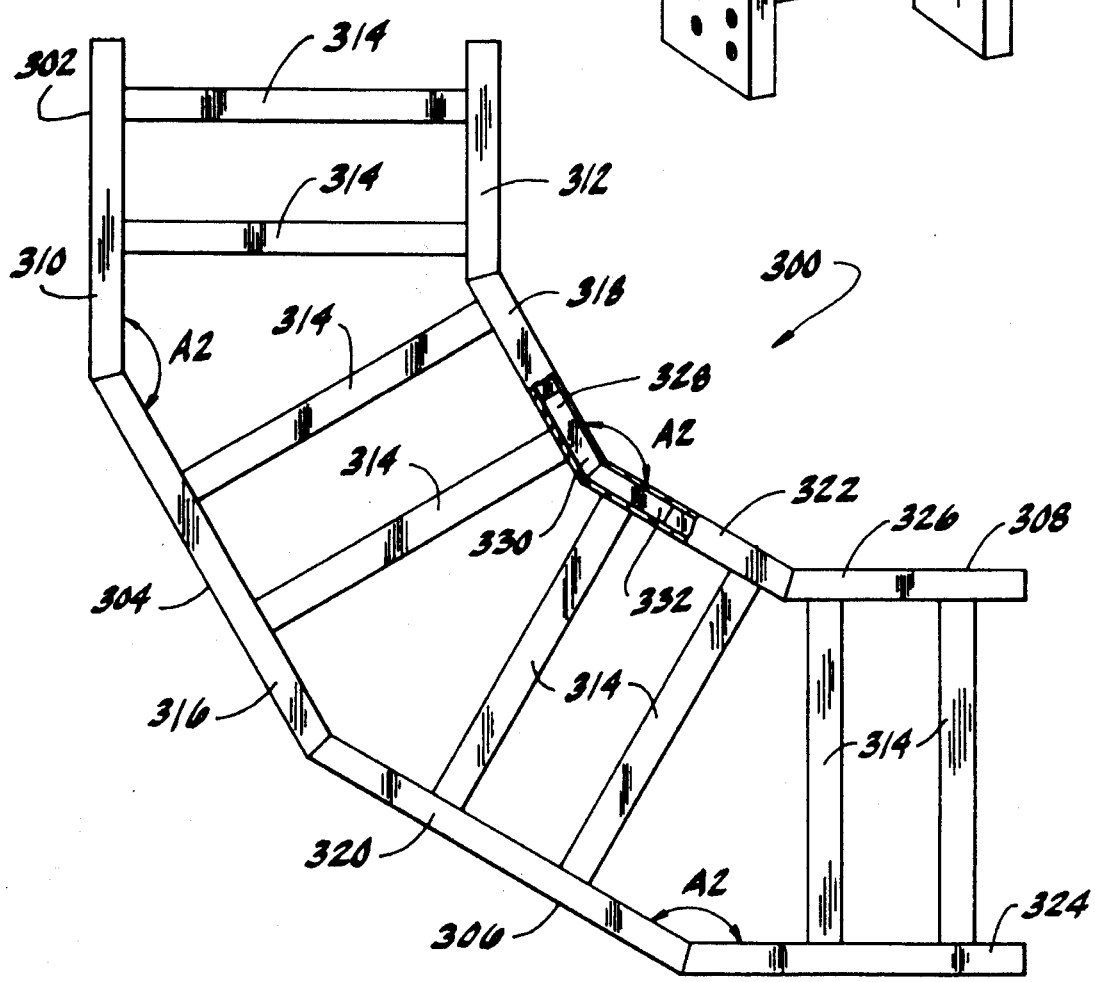

5,465,929

LADDER-TYPE CABLE TRAY SYSTEM

BACKGROUND OF THE INVENTION

This invention relates generally to cable tray systems and, more particularly, to ladder-type cable tray systems.

Conventional ladder-type cable trays are typically suspended from a building support structure in non-residential buildings to carry electrical cables, such as power, telephone, and computer cables. The cable trays are generally shipped to construction sites in sections, with a typical section being twenty feet long. To install the cable tray system, two sections are suspended from the building support structure. The sections are then positioned end-to-end and securely fastened together by threaded fasteners, such as screws or bolts. After the two sections are securely fastened together, another section is suspended from the support structure and securely fastened to one of the first two sections. This procedure is repeated for every additional section of the cable tray system.

A difficulty associated with such cable tray systems is that adjacent sections must be securely fastened together to maintain alignment of the adjacent sections. The sections must be secured together before an additional section may be added. The installer must hold the two sections in alignment with one hand while using the other hand to operate an appropriate tool, such as a screw driver, to secure the sections together. This can be difficult since the sections are typically quite bulky and cumbersome to manipulate. Also, since installation of the cable tray requires alternating back and forth between the suspending procedure and the securement procedure, installation of the cable tray system is time consuming. Further, the installer must constantly carry the tools necessary to perform both procedures. Moreover, since the fasteners function to hold adjacent rail sections together, the fasteners must bear the load placed on the rail sections. Failure of the fasteners of even one rail section will cause the section to separate from an adjacent section.

SUMMARY OF THE INVENTION

Among the several objects of this invention may be noted the provision of an improved ladder-type cable tray system; the provision of such a cable tray system which may be quickly and easily assembled and installed; the provision of such a cable tray system in which all sections may be suspended and connected end to end before any of the sections are securely fastened together; the provision of such a cable tray system having a plurality of splices for connecting cable tray sections end to end; the provision of such a cable tray system which is of a durable and lightweight construction; and the provision of such a cable tray system which is economical to manufacture.

Generally a ladder-type cable tray system of the present invention includes a first cable tray section and a second cable tray section. Each cable tray section comprises first and second rails extending lengthwise of the section at opposite sides of the section and a plurality of rungs adapted to extend between the rails at intervals spaced lengthwise of the section. Each of the first and second rails have a tubular portion forming a hollow beam extending the length of the rail. The tubular portion has open ends at opposite ends of the rail, and a rung-supporting portion integrally formed as one piece with the tubular portion and depending therefrom. The system further comprises means for securing the rungs to the rung-supporting portions of the first and second rails in a position wherein the rungs span the rung-supporting portions, and a plurality of splices for connecting the first and second cable tray sections end to end. The splices include a first splice sized and shaped for a snug telescoping fit within adjacent open ends of the tubular portions of the first rails of the two cable tray sections, and a second splice sized and shaped for a snug telescoping fit within adjacent open ends of the tubular portions of the second rails of the two cable tray sections.

Other objects and features will be in part apparent and in part pointed out hereinafter.

BRIEF DESCRIPTION OF THE DRAWINGS

FIG. 10 is a perspective view of a cable tray configuration in which the cable tray sections are configured to form a vertical bend;

FIG. 11 is a top plan view of a cable tray configuration in which the cable tray sections are configured to form a horizontal bend.

Corresponding reference characters indicate corresponding parts throughout the several views of the drawings.

DESCRIPTION OF THE PREFERRED EMBODIMENTS

Figure 1:
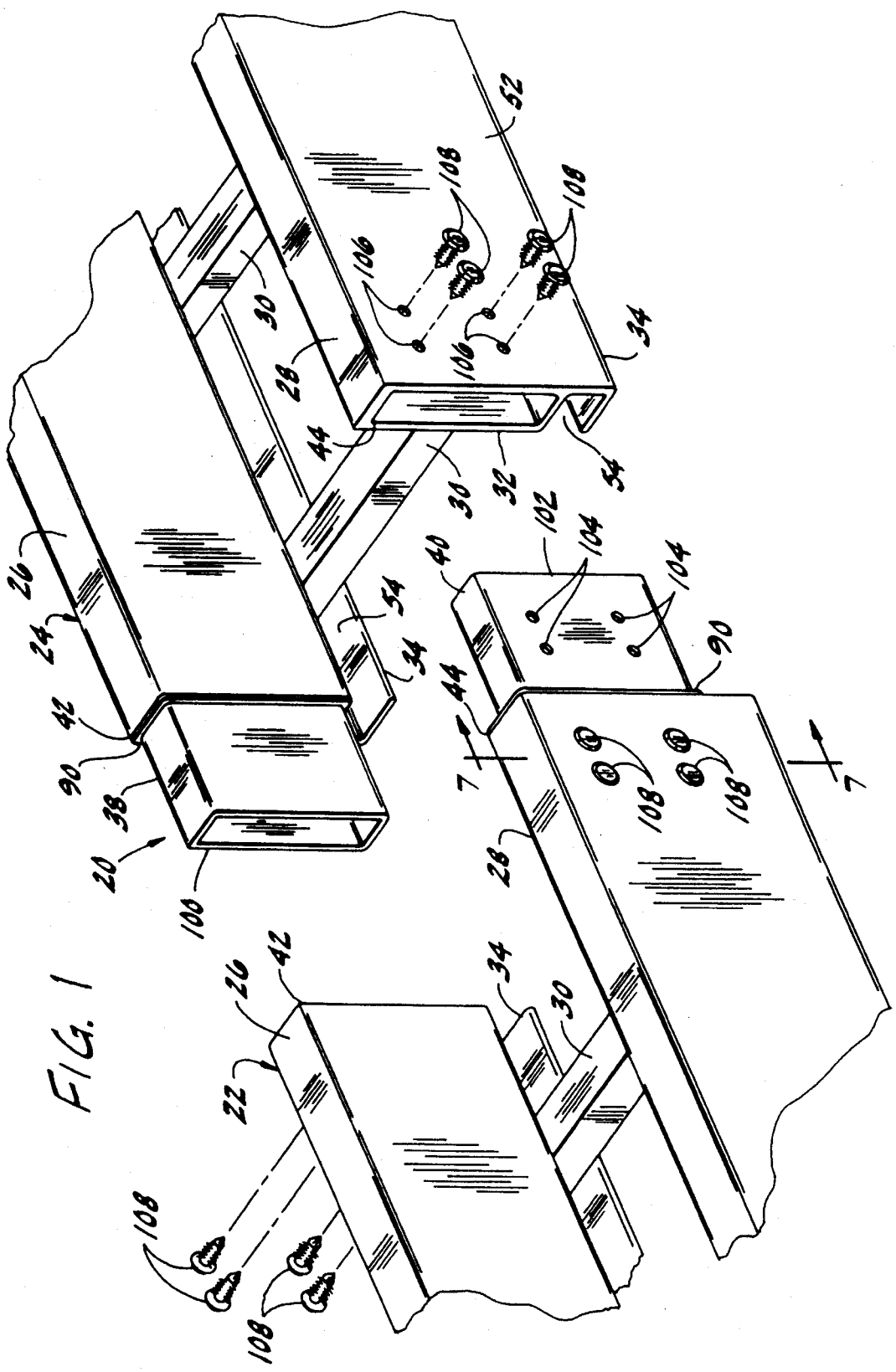
FIG. 1 is an exploded perspective view of two sections of a cable tray of the present invention.

Referring now to the drawings, and first more particularly to FIG. 1, a ladder-type cable tray of the present invention is indicated in its entirety by the reference numeral 20. The cable tray 20 comprises a first cable tray section, generally designated 22, and a second cable tray section, generally designated 24. Each cable tray section 22, 24 has first and second rails 26, 28 extending lengthwise of the section at opposite sides of the section and a plurality of rungs, each designated 30, extending between the rails 26, 28 at intervals spaced lengthwise of the section. Each of the two rails has a tubular portion 32 forming a hollow box beam extending the length of the rail and a rung-supporting portion 34 integrally formed as one piece with the tubular portion 32 and depending therefrom. Preferably, the rails 26, 28 and rungs 30 are pultruded members of fiber reinforced resin.

Opposite ends of the rungs 30 are secured to the rung-supporting portions 34 of the rails 26, 28 in a position wherein the rungs 30 span the rung-supporting portions 34. Rungs 30 may be secured to rung-supporting portions 34 by fasteners, such as screws or clamps, or by a fluent bonding agent, or by any other suitable securing means. Preferably, rungs 30 are secured to the rung-supporting portions 34 by adhesive fasteners 36 (see FIGS. 2–5), described in greater detail below.

The two cable tray sections 22, 24 are connected end to end by first and second splices, indicated at 38, 40. The first splice 38 is sized and shaped for a snug telescoping fit within adjacent open ends 42 of the tubular portions 32 of rails 26 of the two cable tray sections 22, 24. The second splice 38 is sized and shaped for a snug telescoping fit within adjacent open ends 44 of the tubular portions 32 of rails 28 of the two cable tray sections 22, 24.

Figure 2:
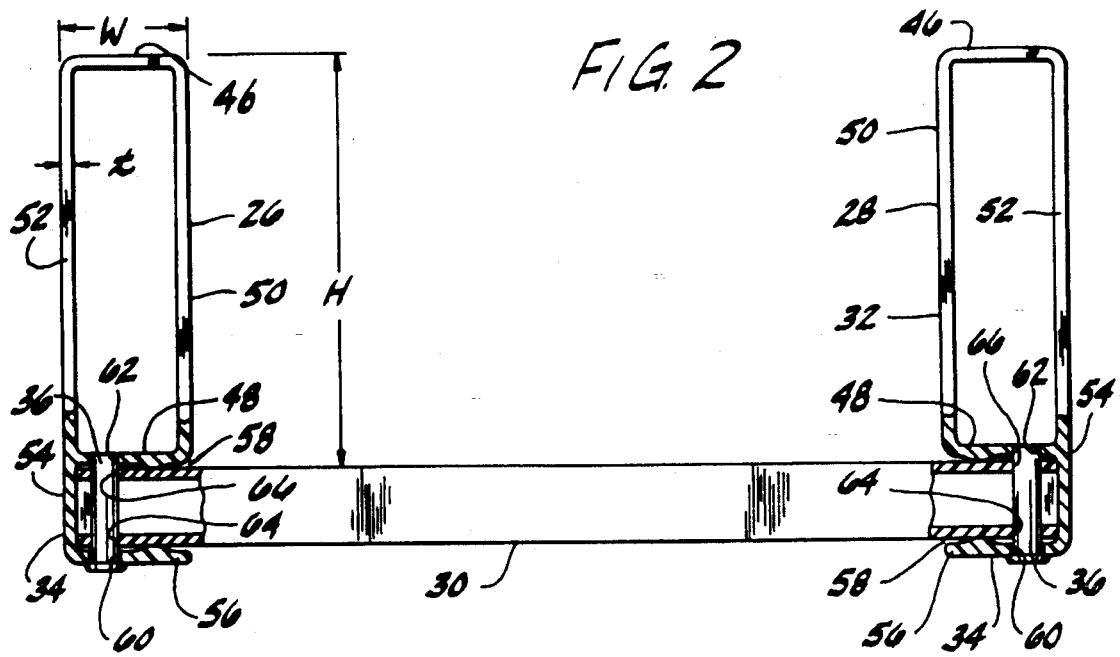
FIG. 2 is an end elevational view of a cable tray section of FIG. 1 with portions broken away to show connection of a rung to first and second rails.
Figure 3:
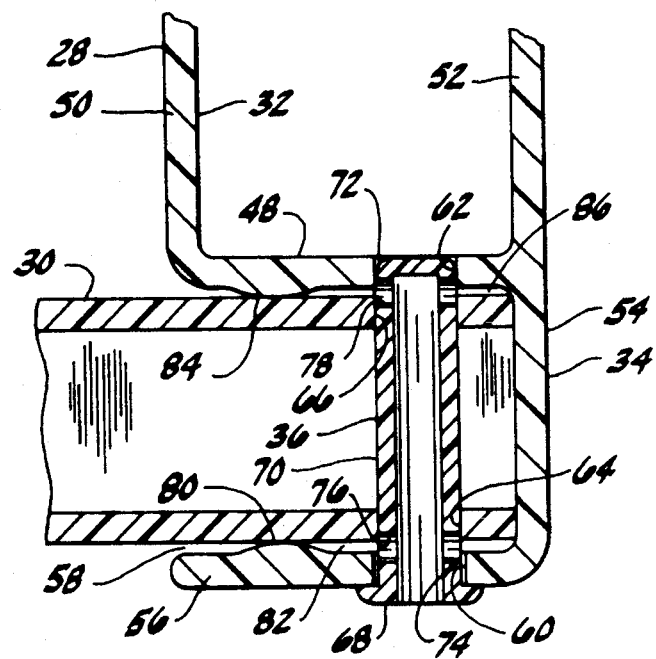
FIG. 3 is an enlarged partial sectional view showing the rung of FIG. 2 connected to a rail of the cable tray section by an adhesive fastener.
Figure 4:
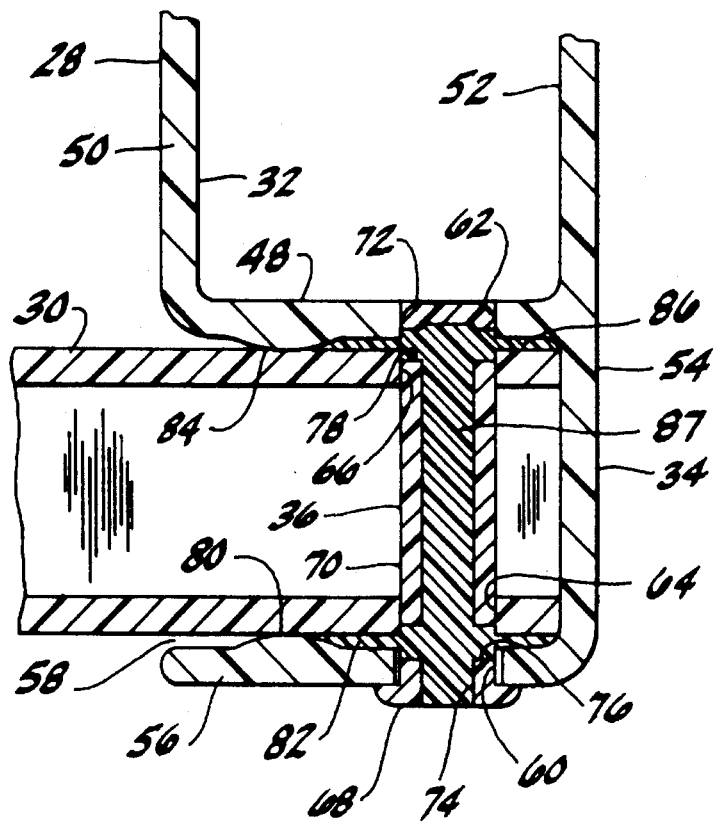
FIG. 4 is an enlarged partial sectional view similar to FIG. 3 with adhesive material filling gaps between the rung and rail.
Figure 5:
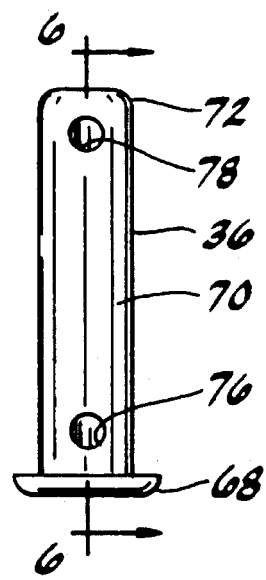
FIG. 5 is a side elevational view of one of the adhesive fasteners.
Figure 6:
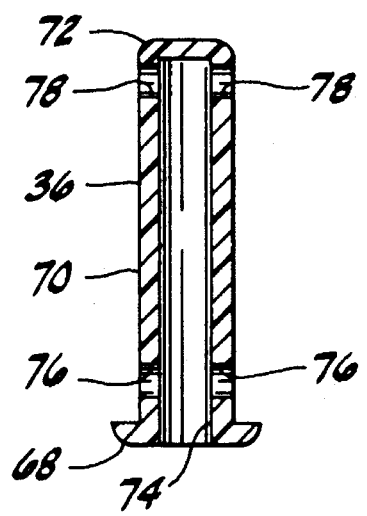
FIG. 6 is a sectional view taken along the plane of line 6—6 of FIG. 5.

Referring to FIGS. 2 and 3, the tubular portion 32 of each rail is generally rectangular in transverse cross-section and has an upper wall 46, a lower wall 48, and opposite side walls 50 and 52. The height of the tubular rail portion 32 is preferably at least twice as great as its width. In an exemplary rail, the tubular rail portion 32 has a height H of approximately 4⅞", a width W of approximately 1½" and a wall thickness t of approximately ⅛". The rung-supporting portion 34 of each rail is generally L-shaped in transverse cross-section and has a first (generally vertical) leg 54 extending down from the lower wall 48 of the tubular portion 32 and a second (generally horizontal) leg 56 extending generally laterally inwardly from the vertical leg 45 at a location spaced below and generally parallel to the lower wall 48 of the tubular portion 32. Preferably, the wall thickness of the rung-supporting portion 34 is equal to the wall thickness t of the tubular rail portion 32. However, it is to be understood that the wall thickness of the rung-supporting portion could be greater than or less than the wall thickness of the tubular rail portion without departing from the scope of this invention. The box shape of the tubular portion provides the highest structural integrity by weight and the L shape of the rung-supporting portion provides an efficient connection layout to the tray. Because of the combination of these shapes, the rails resist lateral movement and twisting, thereby resulting in a uniform distribution of load on the cable tray. Thus, the rails have greater stability than cable tray rails with conventional cross-sectional shapes.

The L-shaped rung-supporting portion 34 of each rail combines with the lower wall 48 of the tubular portion 32 of each rail to define a laterally inwardly opening channel 58 for receiving respective ends of the rungs 30 spanning the two rails 26, 28 of each cable tray section. As shown in FIGS. 2 and 3, each rail has a plurality of first holes 60 in its horizontal leg 56 and a plurality of second holes 62 in its lower wall 48, each of the first holes 60 being aligned with a corresponding one of the second holes 62. Each rung 30 is tubular and generally square in transverse cross-section and has aligned holes 64 and 66 through opposite walls of the rung 30 adjacent an end thereof. The holes 64 and 66 of the rung are alignable with and positionable between an aligned pair of the first and second holes 60 and 62 when an end of the rung 30 is inserted into the rung-receiving channel 58.

As mentioned previously, each rung 30 is connected to the rails 26, 28 by fasteners 36. As shown in FIGS. 2–5, each fastener 36 has a head 68, a shank 70 extending up from the head 68 and terminating in a tapered upper end 72, a longitudinal bore 74 extending axially through the head 68 and into the shank 70, and first and second axially spaced lateral bores 76 and 78 extending laterally through the shank 70 and communicating with the longitudinal bore 74. The shank 70 of each fastener 36 is insertable through a hole 60 in leg 56, holes 64 and 66 in rung 30, and a hole 62 in lower wall 48, all of which holes are aligned when an end of the rung is positioned in the rung-receiving channel 58. Preferably, the horizontal leg 56 of the rung-supporting portion 34 has a raised bead 80, constituting a first spacer, running the entire length of the horizontal leg 56. This bead 80 projects upward and is adapted to contact the lower wall of a rung 30 for maintaining a first space or gap 82 between the horizontal leg 56 and lower wall of the rung. Similarly, the lower wall 48 of the tubular rail portion 32 has a raised bead 84, constituting a second spacer, running the entire length of the lower wall. This bead 84 projects downward and is adapted to contact the upper wall of the rung 30 for maintaining a second space 86 or gap between the lower wall 48 of the tubular portion 32 and the upper wall of the rung 30. The distance between the beads 80 and 84 is approximately the same as the distance between opposite faces of a rung 30 to provide a close fit of the rung 30 in the rung-receiving channel 58. The fastener 36 is configured such that when its head 68 contacts horizontal leg 56 and its shank 70 extends up through aligned holes 60, 62, 64 and 66, the first lateral bore 76 is aligned with and in fluid communication with the lower gap 82 and the second lateral bore 78 is aligned with and in fluid communication with the upper gap 86. When the fastener 36 is so positioned, a fluent adhesive 87 (see FIG. 4) introduced into the longitudinal bore 74 through the head 68 will flow through the lateral bores 76 and 78 and into the upper and lower gap or spaces 82 and 86 to fill the bores 74, 76, and 78 and the gaps 82 and 86. When the adhesive 87 hardens, the fastener 36 is permanently bonded to the rung and rail, the horizontal leg 56 of the rung-supporting portion 34 is permanently bonded to the lower wall of the rung 30, and the lower wall 48 of the tubular rail portion 32 is permanently bonded to the upper wall of the rung 30.

Figure 7:
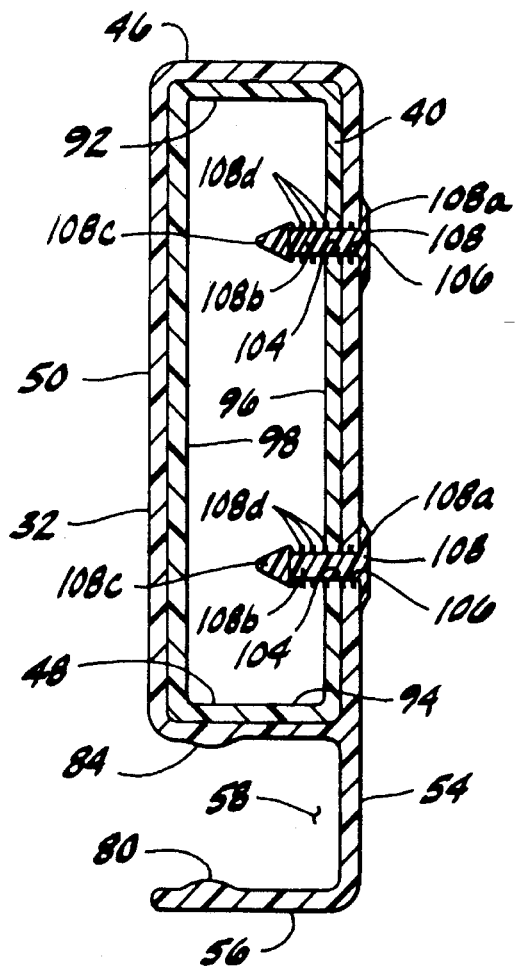
FIG. 7 is a sectional view taken along the plane of line 7—7 of FIG. 1 showing the connection between a splice and a rail of one of the cable tray sections.
Figure 8:
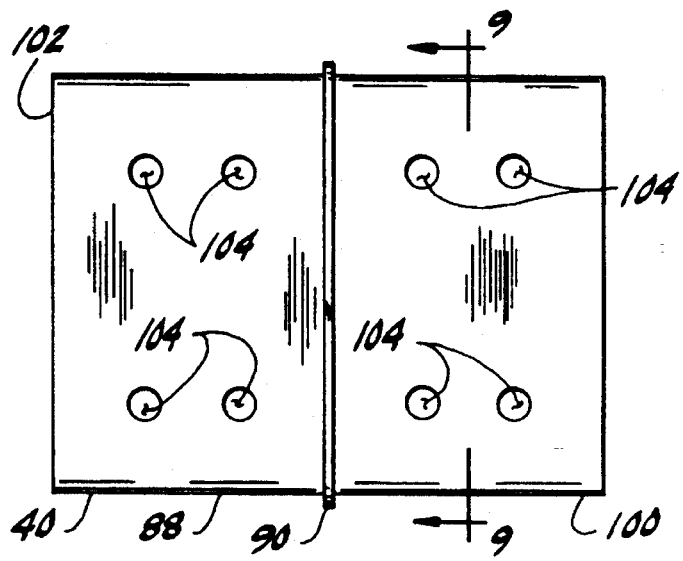
FIG. 8 is a side elevational view of one of the splices.
Figure 9:
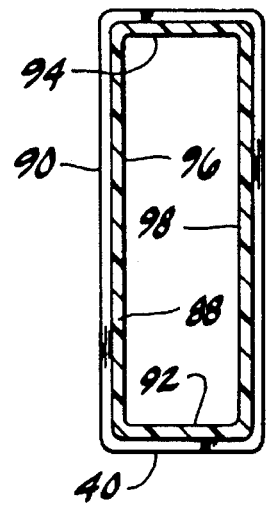
FIG. 9 is a sectional view taken along the plane of line 9—9 of FIG. 8.

Splice 40 is shown in detail in FIGS. 7–9. It is to be understood that splice 38 is preferably identical in construction and that the description of splice 40 and its connection to rails 28 is equally applicable to splice 38 and its connection to rails 27. Splice 40 has a tubular body 88 and a flange 90 extending laterally outwardly from the periphery of the body 88, generally midway between opposite ends of the body 88. The body 88 has an upper wall 92, a lower wall 94, and opposite side walls 96 and 98. The body also has opposite end portions 100, 102, defined as portions of the body 88 from the flange 90 to respective ends of the body 88. These end portions are adapted for insertion in the open ends of the tubular portions 32 of the rails. The flange 90 constitutes a stop adapted to be positioned between and to contact adjacent open ends 44 of the tubular rail portions 32 to ensure that a proper amount (i.e., approximately half) of the splice is inserted into each rail for proper strength. The transverse cross-sectional shape of the body 88 is substantially the same as but slightly smaller than the cross-sectional shape of the open ends 44 of the tubular portions 32 of the rails 28, so that the end portions 100, 102 fit snugly within the open ends of the tubular portions 32. Preferably, the body 88 of the splice and the open ends 44 of the rails are generally rectangular in transverse cross-section. It is to be understood, however, that the splices may alternately have a "C" cross-sectional shape or any other suitable cross=sectional shape.

Referring to FIGS. 1 and 8, the side wall 96 of splice 40 has eight through apertures therein, each designated 104. Four of these apertures 104 are in end portion 100 and the remaining four are in end portion 102. The outwardly facing side wall 52 of the tubular portion 32 of each rail 28 also has four apertures 106 therein adjacent each of its open ends 44. When the end portions 100, 102 of the splices are inserted into their corresponding tubular rail portions 32, and the flange 90 is in contact with the open ends 44 of the tubular rail portions 32, the four apertures 104 of end portion 100 align with the four apertures 106 in the corresponding tubular rail portion 32, and the four apertures 104 of end portion 102 align with the four apertures 106 in the corresponding tubular rail portion 32. As shown in FIGS. 1 and 7, a plurality of locking pins 108 extend through aligned apertures 106 and 104 in the tubular rail portion 32 and splices 40 to secure the splice to the rails (and thus the rails to each other). Preferably, the locking pins 108 are push-type snap fasteners, such as those available from ITW Fastex Distribution of Des Plaines, Ill., under the trademark "Christmas Tree Clips." Each locking pin 108 has a head 108a, a shank 108b extending inwardly (left as shown in FIG. 7) from the head 108a and terminating in a cone-shaped end 108c, and a plurality of annular ribs 108d projecting radially from the shank 108b. The cone-shaped end 108c of the locking pin 108 is wider than the diameter of the aperture 104 in the splice to retain the pin 108 in the rail and splice after the pin has been snapped through the apertures 106, 104 in the rail and splice. The end 108c elastically deforms as the pin 108 is pushed through these apertures, but returns to its original shape after it clears (i.e., is pushed beyond) the aperture 104 in the splice. The pin ribs 108d resist outward movement (withdrawal) of the pin 108 relative to the rail and splice. Because the end portions 100, 102 of the splices 38, 40 fit snugly within respective tubular rail portions 32, the splices prevent relative lateral movement between adjacent rails even without the locking pins 108. The locking pins 108 prevent axial movement of the rails relative to the splices but do not bear the load placed on the rails. Thus, the splices 38, 40 will hold adjacent rails together even if the locking pins fail.

To install a cable tray system of this invention, the first and second cable tray section 22, 24 are suspended from a building support. Splice 38 is then inserted into adjacent open ends 42 of rails 26, and splice 40 is inserted into adjacent open ends 44 of rails 28. The rails 26, 28 are held together by the friction fit between the splices and rails. This friction fit is sufficient to maintain connection of the cable tray sections 22, 24 during suspension and connection of additional cable tray sections. Thus, all sections of the cable tray section may be suspended and connected end to end before any of the sections are securely fastened together. After all cable tray sections of the system are suspended and connected, the locking pins 108 are pushed into the aligned apertures 104, 106 of the splices and rails to lock the splices to the rails. Since the locking pins 108 are preferably push-type snap connectors, the sections may be secured together without any tools.

Figure 12:
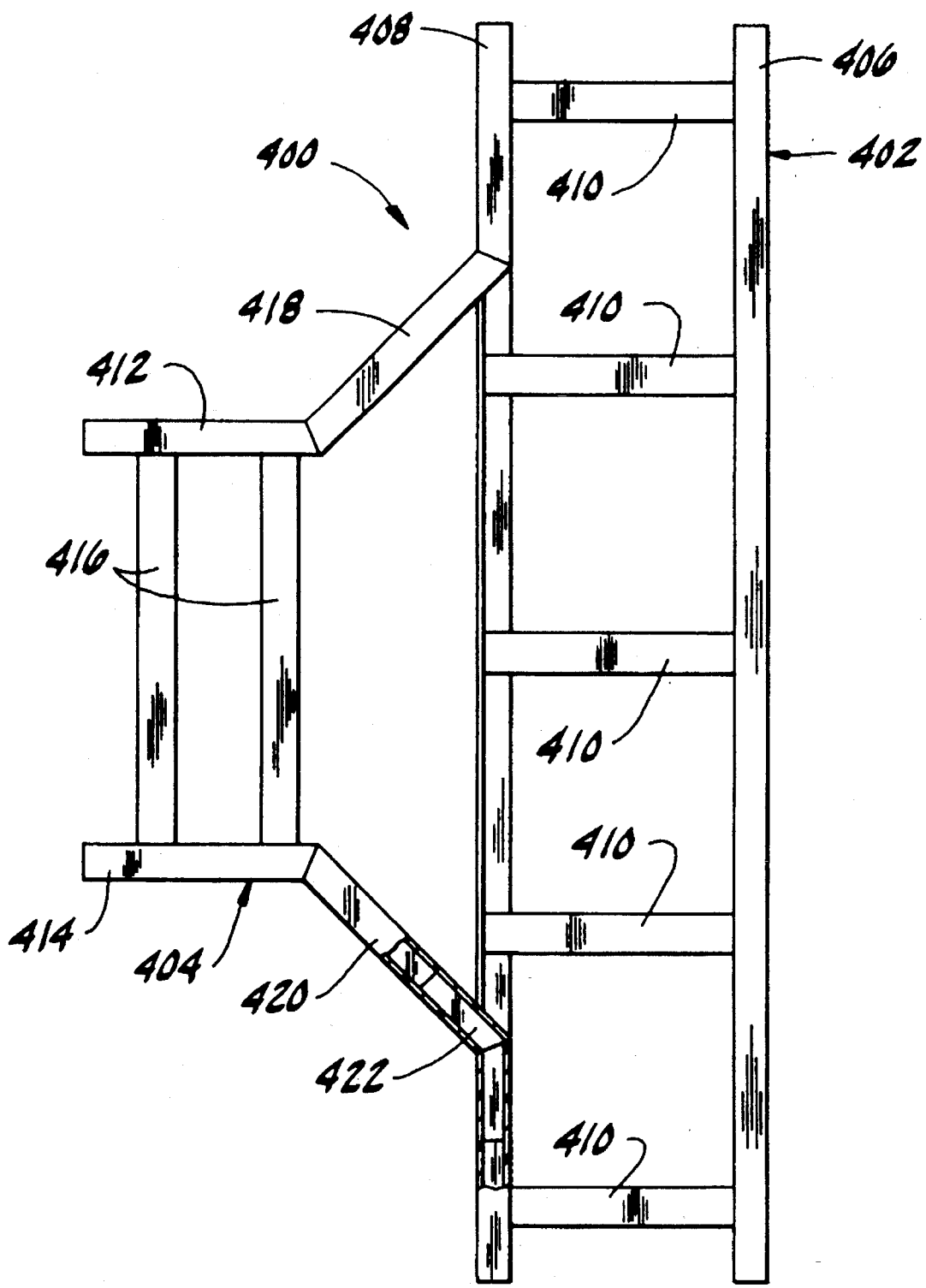
FIG. 12 is a top plan view of a cable tray configuration in which the cable tray sections are arranged to form a horizontal tee.

FIGS. 10–12 show cable tray configurations of the present invention different from the cable tray sections 22, 24 illustrated in FIG. 1.

FIG. 10 shows a cable tray configuration, generally designated 200 comprising four cable tray sections 202, 204, 206, and 208. The rails of each section have mitered ends which contact the ends of the rails of adjacent sections. The sections combine to form a vertical bend in a run of cable tray. Preferably, the angle A1 formed by adjacent sections is approximately 150°. Although not shown, it is to be understood that the splices connecting the sections 202, 204, 206, and 208 have first and second end portions, with the second end portion extending at an angle from the first end portion corresponding to the angle A1 formed by adjacent cable tray sections.

FIG. 11 shows a cable tray configuration, generally designated 300, having a first cable tray section 302, a second cable tray section 304, a third cable tray section 306 and a fourth cable tray section 308. Section 302 has first and second parallel rails 310 and 312 and a pair of rungs 314 extending between rails 310 and 312. Section 304 has first and second parallel rails 316 and 318 and a pair of rungs 314 extending between rails 316 and 318. Section 306 has first and second parallel rails 320 and 322 and a pair of rungs 314 extending between rails 320 and 322. Section 308 has first and second parallel rails 324 and 326 and a pair of rungs 314 extending between rails 324 and 326. The first rail of each cable tray section is longer than the second rail of the section to form a horizontal bend when the cable tray sections are connected to one another. The cable tray sections are connected end to end by a plurality of splices 328 (only one of which is shown in FIG. 10). Each such splice 328 has a first splice end portion 330 and a second splice end portion 332 extending at an angle from the first splice end portion 330. The first and second splice end portions 330 and 332 form an angle equal to the angle A2 between the two cable tray sections connected by the splice. The transverse cross-sectional shapes of the first and second rails of cable tray configuration 300 are the same as the transverse cross-sectional shapes of rails 26, 28 of cable tray 20, shown in FIGS. 1 and 2.

FIG. 12 shows a cable tray configuration, generally designated 400, having a first cable tray section, generally designated 402, and a second cable tray section, generally designated 404. Section 402 has first and second parallel rails 406 and 408 and a plurality of rungs 410 extending between rails 406 and 408. The second rail 408 is similar to rails 26, 28 of FIGS. 1–5 except an intermediate region of the tubular rail portion has been removed. Section 404 has first and second parallel rails 412 and 414 and a plurality of rungs 416 extending between rails 412 and 414. Rails 412 and 414 of second section 404 are generally perpendicular to rails 406 and 408 of first section 402 and are connected to rail 408 by tubular connectors 418 and 420. A plurality of bent splices 422 (only one of which is shown in FIG. 12) join connector 418 to rails 412 and 408 and join connector 420 to rails 414 and 408. Sections 402 and 404 combine to form a cable tray tee configuration.

It is to be understood that a cable tray system of the present invention may use any combination of the various cable tray sections shown in FIGS. 1–12 and may include sections having other shapes.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A ladder-type cable tray system including,
   a first cable tray section,
   a second cable tray section,
   each cable tray section comprising first and second rails extending lengthwise of the section at opposite sides of the section and a plurality of rungs adapted to extend between the rails at intervals spaced lengthwise of the section, each of said first and second rails having a tubular portion forming a hollow beam extending the length of the rail, said tubular portion having open ends at opposite ends of the rail, and a rung-supporting portion integrally formed as one piece with said tubular portion, said rung-supporting portion depending from said tubular portion, said rung-supporting portion being generally L-shaped in a cross-section taken generally transversely with respect to the rail, means for securing said rungs to said rung-supporting portions of said first and second rails in a position wherein the rungs span said rung-supporting portions, and a plurality of splices for connecting said first and second cable tray sections end to end, said splices including a first splice sized and shaped for a snug telescoping fit within adjacent open ends of the tubular portions of said first rails of the two cable tray sections, and a second splice sized and shaped for a snug telescoping fit within adjacent open ends of the tubular portions of said second rails of the two cable tray sections, each rail of said first and second rails having a transverse cross sectional shape different from the transverse cross sectional shapes of said rungs and splices.

2. A cable tray assembly as set forth in claim 1 wherein the tubular portions of the rails form hollow box beams.

3. A cable tray assembly as set forth in claim 2 wherein the tubular portion of each rail is generally rectangular in transverse cross-section and has an upper wall, a lower wall and opposite side walls.

4. A cable tray assembly as set forth in claim 3 wherein the rung-supporting portion of each rail comprises a first leg extending down from the lower wall of said tubular portion of the rail, and a second leg extending generally laterally inwardly from the first leg at a location spaced below the lower wall of said tubular portion, said L-shaped rung-supporting portion of each rail combining with the lower wall of the tubular portion of each rail to define a laterally inwardly opening channel for receiving respective ends of said rungs spanning the rails of each cable tray section.

5. A cable tray assembly as set forth in claim 4 wherein:

each rail has a first hole in the second leg of its L-shaped rung-supporting portion and a second hole in the lower wall of its tubular portion, the first hole being aligned with the second hole;

each rung has a through hole adjacent an end thereof alignable with and positionable between the first and second holes of a corresponding one of the rails; and said rung securing means comprises a plurality of elongate fasteners, each fastener having a shank insertable through the first and second holes of a corresponding one of the rails and through the hole of a corresponding one of the rungs.

6. A cable tray assembly as set forth in claim 5 wherein the shank of each fastener has a longitudinal bore and first and second longitudinally spaced lateral bores for channeling a fluent adhesive, introduced into the longitudinal bore, between one of the rungs and the second leg of the L-shaped rung-supporting portion of one of the rails and between said one of the rungs and the lower wall of the tubular portion of said one of the rails, so that when the adhesive hardens, the fastener is permanently bonded to the rung and rail, and the rung is permanently bonded directly to the rail.

7. A cable tray assembly as set forth in claim 6 wherein said L-shaped rung-supporting portions and the lower walls of the tubular portions have spacers adapted to contact the rungs and maintain first spaces between the second legs of the L-shaped rung-supporting portions and said rungs and second spaces between the lower walls of said tubular portions and said rungs, said first lateral bores of the fasteners being generally aligned with the first spaces and said second lateral bores being generally aligned with the second spaces when the fasteners are inserted in the rails and rungs.

8. A cable tray assembly as set forth in claim 7 wherein the spacers comprise raised beads running substantially the entire length of the rung-supporting portions and the lower walls of the tubular portions.

9. A cable tray assembly as set forth in claim 3 wherein the height of the tubular portion of each rail is at least twice as great as its width.

10. A cable tray assembly as set forth in claim 3 wherein each splice has a transverse cross-sectional shape substantially the same as but slightly smaller than the cross-sectional shape of respective open ends of said tubular portions of the rails to be connected by the splice.

11. A cable tray assembly as set forth in claim 10 wherein each splice is generally rectangular in transverse cross-section.

12. A cable tray assembly as set forth in claim 11 wherein each splice is tubular and has an upper wall, a lower wall and opposite side walls.

13. A cable tray assembly as set forth in claim 12 wherein the tubular portion of each rail has at least one aperture extending through a wall of the tubular portion adjacent each end thereof and wherein each splice has at least two apertures therein positioned so that when the splice is inserted into the open ends of the tubular portions of adjacent rails, the apertures in the splice align with corresponding apertures in the tubular portions of the rails.

14. A cable tray assembly as set forth in claim 13 further comprising a plurality of locking pins for securing each splice to the tubular portions of adjacent rails, each locking pin being adapted to extend through aligned apertures in the splice and the tubular portion of a respective rail.

15. A cable tray assembly as set forth in claim 14 wherein each splice further includes a stop extending laterally outwardly from one or more walls of the splice, said stop being engageable with the open ends of the tubular portions of adjacent rails to limit the distance the splice may be inserted into the tubular portions, the apertures in the splice being aligned with the apertures of the tubular portions of adjacent rails when the stop is in contact with the open ends of the tubular portions.

16. A cable tray assembly as set forth in claim 1 wherein:

the rung-supporting portions of the rails have holes therethrough;

the rungs have holes therethrough alignable with the holes of the rung-supporting portions; and said rung securing means comprises a plurality of elongate fasteners, each fastener having a shank insertable through aligned holes in a respective rung and the rung-supporting portion of a respective rail.

17. A cable tray assembly as set forth in claim 16 wherein the shank of each fastener has a longitudinal bore and at least one lateral bore for channeling a fluent adhesive, introduced into the longitudinal bore, between one of the rungs and one of the rung-supporting portions to bond the rung to the rung-supporting portion.

18. A cable tray assembly as set forth in claim 1 wherein the rails are pultruded members of fiber reinforced resin.

\* \* \* \* \*